United States Patent
Lin et al.

(10) Patent No.: US 12,240,497 B1
(45) Date of Patent: Mar. 4, 2025

(54) DETERMINING INTENTION OF BICYCLES AND OTHER PERSON-WIDE VEHICLES

(71) Applicant: Zoox, Inc., Foster City, CA (US)

(72) Inventors: Yi-Ting Lin, Foster City, CA (US); Derek Xiang Ma, San Carlos, CA (US); Kenneth Michael Siebert, Redwood City, CA (US); Oytun Ulutan, Buena Park, CA (US)

(73) Assignee: Zoox, Inc., Foster City, CA (US)

( * ) Notice: Subject to any disclaimer, the term of this patent is extended or adjusted under 35 U.S.C. 154(b) by 233 days.

(21) Appl. No.: 17/949,566

(22) Filed: Sep. 21, 2022

(51) Int. Cl.
| | | |
|---|---|---|
| *B60W 60/00* | (2020.01) | |
| *B60W 40/04* | (2006.01) | |
| *B60W 50/00* | (2006.01) | |
| *G06V 10/70* | (2022.01) | |
| *G06V 20/58* | (2022.01) | |
| *G06V 40/10* | (2022.01) | |
| *G06V 40/20* | (2022.01) | |

(52) U.S. Cl.
CPC ........ *B60W 60/0017* (2020.02); *B60W 40/04* (2013.01); *B60W 50/0097* (2013.01); *B60W 60/00274* (2020.02); *G06V 10/70* (2022.01); *G06V 20/58* (2022.01); *G06V 40/10* (2022.01); *G06V 40/20* (2022.01); *B60W 2420/403* (2013.01); *B60W 2554/4026* (2020.02); *B60W 2554/4045* (2020.02)

(58) Field of Classification Search
CPC ....... B60W 60/0017; B60W 60/00274; B60W 40/04; B60W 50/0097; B60W 2420/403; B60W 2554/4026; B60W 2554/4045; G06V 10/70; G06V 20/58; G06V 40/10; G06V 40/20
See application file for complete search history.

(56) References Cited

U.S. PATENT DOCUMENTS

| | | | |
|---|---|---|---|
| 11,003,955 B1 | 5/2021 | Tan | |
| 2019/0147254 A1* | 5/2019 | Bai | ......................... G01S 17/86 |
| | | | 382/104 |

(Continued)

FOREIGN PATENT DOCUMENTS

| | | | |
|---|---|---|---|
| WO | WO-2020113187 A1 * | 6/2020 | |

OTHER PUBLICATIONS

Goldhammer et al.; Intentions of Vulnerable Road Users—Detection and Forecasting by Means of Machine Learning; IEEE transactions on intelligent transportation systems; 2019 (Year: 2019).*

*Primary Examiner* — Michael J Zanelli
(74) *Attorney, Agent, or Firm* — EIP US LLP

(57) ABSTRACT

There is provided methods, systems, and computer-readable media for determining intention of bicycles and other person-wide vehicles. A method comprises: receiving, from one or more sensors of an autonomous vehicle, sensor data relating to an external environment of the autonomous vehicle; detecting, based at least in part on the sensor data, a person-wide vehicle in the external environment proximate to the autonomous vehicle; determining, based at least in part on the sensor data and the person-wide vehicle, image data including the person-wide vehicle; inputting the image data to a machine-learned model; receiving, from the machine-learned model based on the image data, a future intention of the person-wide vehicle; and controlling the autonomous vehicle based at least in part on the future intention of the person-wide vehicle.

20 Claims, 6 Drawing Sheets

(56) References Cited

U.S. PATENT DOCUMENTS

| | | |
|---|---|---|
| 2019/0332118 A1 | 10/2019 | Wang et al. |
| 2020/0012285 A1* | 1/2020 | Delp ..................... G06V 20/58 |
| 2020/0192872 A1 | 6/2020 | Quinn |
| 2021/0114627 A1* | 4/2021 | McCurrie ............. G06N 3/047 |
| 2021/0181758 A1 | 6/2021 | Das et al. |
| 2021/0192748 A1* | 6/2021 | Morales Morales .. G06V 10/82 |
| 2021/0354730 A1* | 11/2021 | Anthony ............... B60W 40/04 |

* cited by examiner

DETERMINING INTENTION OF BICYCLES AND OTHER PERSON-WIDE VEHICLES

BACKGROUND

It is becoming more common to replace manual functionality on vehicles with autonomous control. For example, road vehicles may be configured to navigate autonomously through an external environment without input from a driver. Some of these vehicles may be driverless vehicles. To navigate autonomously, a vehicle may use data gathered by one or more sensors to detect the external environment. In particular, the vehicle may be configured to use the data to identify objects in the external environment. In order to navigate safely, the vehicle may take account of how the objects act or are expected to act. For improved operation of a vehicle that has autonomous control, it may be useful to understand in real time how an object is acting as well as how an object is going to act or intending to act in future.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
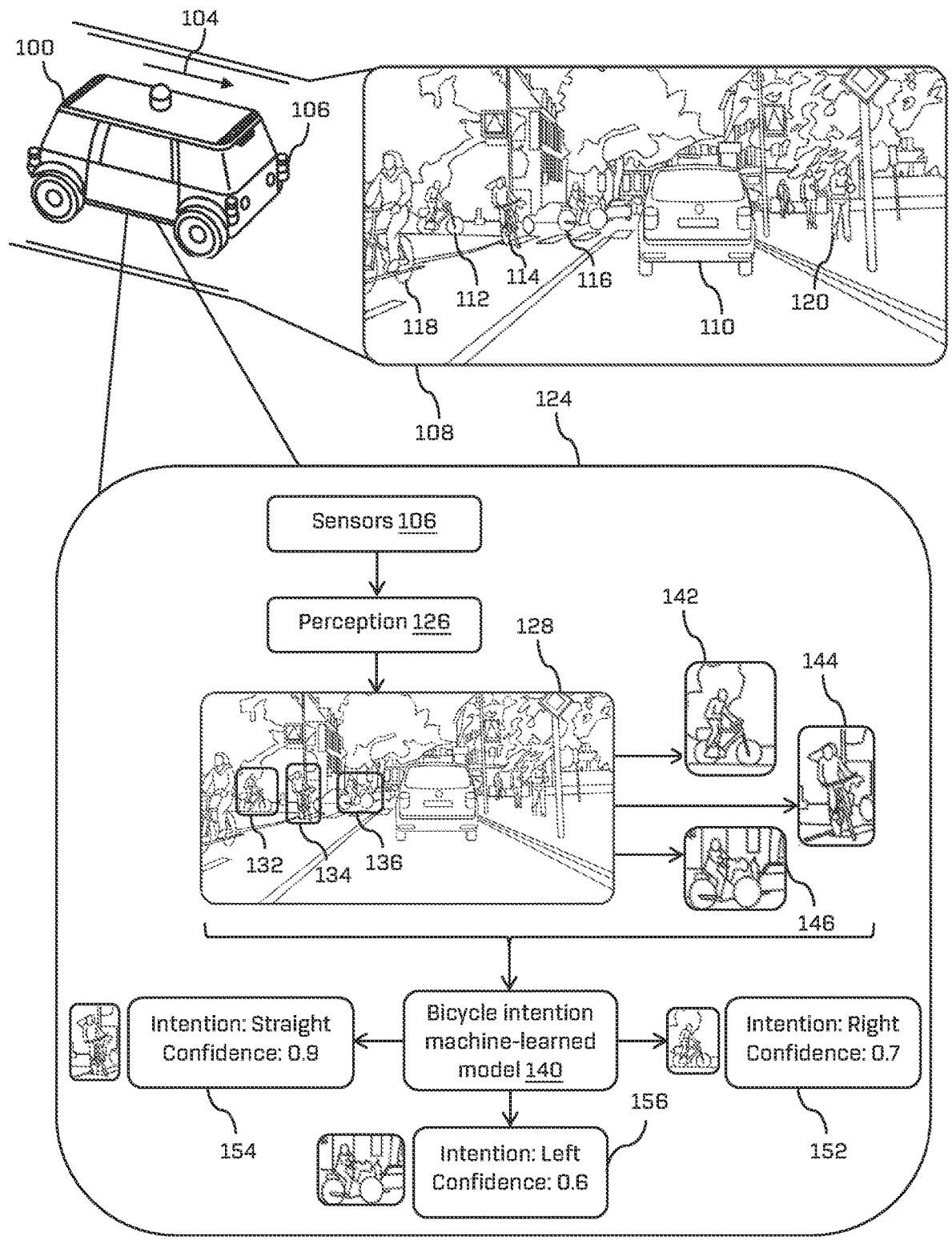
FIG. 1 is a pictorial diagram of a process for determining future intention of bicycles according to the present invention.

This application relates to methods, systems, and computer-readable media that allow for future intentions of bicycles and similar modes of transport to be determined by autonomous vehicles. The techniques described herein may increase detection effectiveness and capabilities of a computer vision system.

Users of bicycles and other, similar vehicles, such as motorcycles and electric scooters, may, inadvertently or otherwise, provide visual signals or cues to indicate their future intentions. A future intention may also be referred to as an intention or an intended action. A future intention may be an intention to travel in a straight line, an intention to make a left or right turn, or an intention to stop the bicycle or remain stopped. Examples of visual cues may be head turning, operation of controls of the bicycle such as brakes or steering, other movements such as extensions of a foot or hand, or leaning of the bicycle. These signals may also be employed by other road users.

In this application, visual data from cameras and other image sensors of an autonomous vehicle or to which the autonomous vehicle has access may be used as input to a model. The model may be part of a wider computer vision system. Using the visual data, which may include a series of image frames, the model may be able to predict whether a particular road user, such as a bicycle, is going to make a turn, travel straight ahead, or stop. This prediction may be referred to as a future or predicted intention of the bicycle/bicyclist, and is a prediction of the intention at a future point in time. This intention can be one signal that can be used to improve predictive states of bicyclist within an environment.

The model can be a model trained to identify future intention of bicycles. The model may be trained using visual data relating to such modes of transport extracted from stored data that was collected previously. The stored data may be referred to as log data and may have been collected by one or more other vehicles over one or more journeys. The model may be trained by providing visual data and an associated action that the visual data represents or corresponds to. The visual data may be extracted by categorizing an action using other data than visual data, such as data from LIDAR sensors, and subsequently identifying visual data that corresponds to that action. The action may correspond to a future intention that the model should eventually predict. In other words, in some examples, the action may be the bicycle making a turn, travelling straight ahead, or being stopped. Actions may be considered to be performed actions rather than intended actions. The visual data may be extracted from before the action to allow the model to be trained based on visual cues that may pre-empt an action.

The output of the model may be used to control the autonomous vehicle. In a particular example, when the autonomous vehicle is sensing a bicycle, for example, it may combine the predicted future intention for the bicycle output from the model with other predictive models or output from those predictive models that use different data as input. This may allow for more accurate predictions of a predicted trajectory that the bicycle may take, for example. In general, combining outputs of predictive models may result in greater accuracy in prediction and lead to improvements in the operation of the autonomous vehicle, particularly with regard to safety and efficiency. Using visual data as described above may be useful because visual signals or cues may be made further in advance of the turn than other signals or cue, which then means that the autonomous vehicle is able to react to turns from such road users in a more optimal way.

The modes of transport referred to above, which may employ leaning to turn, gestures or movements from users to indicate future intentions, and/or which may have external controls whose operation may be visible to a proximal camera or image sensor may be referred to person- or man-wide vehicles. In some examples, the external controls may be manual. Person-wide vehicles may also adopt specific road positions based on their intentions.

A person-wide vehicle may be a single-track vehicle or a narrow-track vehicle. A single-track vehicle may be a two-wheeled vehicle, such as a bicycle, motorcycle, scooter, or a one-wheeled vehicle such as a unicycle. A single-track vehicle may leave a single track on a surface as it travels across that surface. A narrow-track vehicle may be a skateboard, inline skates, or a trike or tricycle. A narrow-track vehicle may leave a narrow track on a surface as it travels across that surface, the narrow track typically being less than two-person widths. Person-wide vehicles may be human-powered, motor-powered, or hybrid of human- and motor-powered. For convenience, the examples of the techniques below are described with reference to a bicycle or a plurality of bicycles, but the techniques and aspects may be applied to any person-wide vehicle.

Generally, in other systems, autonomous vehicles may be configured to use data gathered from one or more sensors mounted on the autonomous vehicle to understand the environment around them. The understanding of the environment based on the data from the sensors may be used by planning systems to determine how to act appropriately in a given situation. In particular, autonomous vehicles may track other vehicles, pedestrians, and dynamic or moving objects in the environment. In these other systems, methods for tracking and predicting movements of person-wide vehicles such as bicycles may use data from LIDAR sensors. Using LIDAR data, a visualization of the external environment may be developed and objects, including person-wide vehicles, may be identified. Position, velocity, and/or yaw of an object may be determined based on the LIDAR data. A prediction system may be configured to predict a path that a particular object will take along a road. However, because person-wide vehicles may turn relatively sharply or suddenly, it may be difficult to determine based on LIDAR data that a turn is intended until the turn is actually made. Accordingly, up until the turn is actually in progress and can be measured based on position, velocity, and/or yaw, predictions of the trajectory of a person-wide vehicle may be inaccurate.

Accordingly, in the present application, methods, systems, and computer-readable media have been developed that take account of particular visual cues and/or signals that bicycles and other person-wide vehicles and/or their users employ to indicate to other road users that they are going to perform a maneuver such as a turn and/or that they provide when intending to perform other actions such as travelling straight forward or stopping. The techniques described herein may determine these signals using visual data, such as data gathered from a camera or other image sensor mounted on an autonomous vehicle or to which the vehicle has access. Visual data may also be referred to as image data. The image data may be used in addition to LIDAR, radar, or other sensor data to enable intention of bicycles and other person-wide vehicles to be determined. For example, a bicycle may be initially identified based on LIDAR data, before visual data relating to the bicycle is obtained and analyzed using a machine-learned model. While the bicycle may be identified in the LIDAR or other sensor data at a specific point in time, prior to that specific point in time, the bicycle may have been tracked but not identified as a bicycle. In other words, a bicycle, prior to identification, may be tracked as an object. Once the bicycle is identified, visual data relating to the bicycle may be obtained corresponding to the specific point in time as well as points in time in the past where the bicycle was being tracked but had not been identified.

Once the visual data is provided to the machine-learned model, the machine-learned model may provide as an output a future intention of the bicycle. For example, the machine-learned model may output an indication of whether the bicycle is predicted to turn left, turn right, travel straight ahead, or stop. If it is predicted that the bicycle intends to turn left, for example, this may be based on the model detecting that the bicycle is leaning to the left, that a user of the bicycle has their left hand and arm outstretched, or that the user of the bicycle is looking over their left shoulder.

The future intention may be different to a current action being performed by the bicycle. For example, the bicycle may be travelling straight ahead but the model may identify that the future intention is to turn left. Alternatively, the bicycle may be turning left and therefore leaning, but the model may identify that the future intention is to continue straight ahead. The machine-learned model can therefore predict, based on a current action and visual cues, a future intention for a short time in the future. The short time may be milliseconds or seconds in the future.

The machine-learned model may be a model trained using log data previously gathered by the autonomous vehicle, by other autonomous vehicles, or by vehicles fitted with sensors and configured to gather such data. The log data may be analyzed in order to identify data relating to bicycles and/or other person-wide. The data relating to bicycles may be analyzed to determine how the bicycle acted, i.e., whether it turned left, turned right, travelled straight, or stopped. How the bicycle acted may be referred to as an action or a performed action when referring to data used for training a model. The data may train the model to determine an attribute of a bicycle and/or of a user of the bicycle based on image data. For example, the model may be configured to determine head movements or other movements of the user, or leaning of the user or bicycle.

Some visual cues may be more useful than other visual cues. For example, operation of visible controls of a vehicle and leaning may be more reliable indicators of a future intention than, for example, hand movements. Hand movements, in particular, may be unreliable and not a good indicator of future intent of a bicycle. This may be because hand movements may be difficult to see, depending on the orientation of the bicycle relative to the camera or other image sensor. Another reason for this unreliability may be because a user may make hand movements for other actions, such as to hold a bicycle upright when stationary, to balance when the bicycle is moving, to reach for items, or to operate particular controls of the bicycle.

In some examples, the machine-learned model may be configured to output a confidence level associated with the future intention of the bicycle. For example, the confidence level may be 100% or 1.0 and this may indicate that a very high probability that a left turn will be performed. In some examples, a high confidence level may correlate with how imminent the intended action is. In some such examples, the bicycle may already be performing or beginning to perform a left turn and the intention may be able to indicate, therefore, that the left turn will continue with a high degree of confidence because the same visual cues are present as when the left turn began. In other examples the confidence level may be lower if the visual cues are ambiguous or do not definitively indicate a particular action. In some examples, a plurality of confidence levels may be provided, comprising a confidence level for each of the possible outputs of the model.

A confidence level may be used to improve predicted trajectories of the bicycle. For example, a prediction component of the vehicle may be configured to predict a trajectory of a bicycle. The predicted trajectory may be based on the determined future intention for the bicycle. For example, the prediction component may be configured to determine, based on one or more other models, a plurality of possible or expected trajectories for the bicycle based on, e.g., LIDAR data, and determine associated confidence levels for those trajectories. The future intention of the bicycle output by the model may be used to weight one or more of the expected trajectories. The future intention may comprise more than one confidence level associated with it, each confidence level being associated with a possible intention (i.e., left turn, right turn, travel straight, stop). These confidence levels may be used to weight expected trajectories. In some examples, other models and/or other data may be combined with the predicted future intention to predict how the bicycle may act. For example, average velocity data, instantaneous velocity data, yaw data, traffic state data, road network data, etc. may be combined with the future intention to determine a predicted trajectory or path that the bicycle is expected to take in future.

Using the techniques described in this application, control of an autonomous vehicle may be improved. This improvement may be provided because the autonomous vehicle is able to detect more accurately intentions of bicycles and other person-wide vehicles and act accordingly. The combined use of visual and other types of sensor data ensures that different attributes that contribute to an action performed by a person-wide vehicle can be captured. The particular use of image data allows for determination of a turn or other action sooner than may be possible using other means such as LIDAR data. Improving the ability of an autonomous vehicle to accurately determine future intention of bicycles and other person-wide vehicles may improve the safety of users of those vehicles, as well as the safety of users of the autonomous vehicle. This may be because the autonomous vehicle is able to act more proactively and may not have to stop as suddenly as it would if predictions of the intended actions of bicycles were less accurate.

FIGS. 1 to 5 are provided to illustrate embodiments of the invention. FIG. 1 provides an overview of a scenario in which an autonomous vehicle is traversing an environment and detects a bicycle in its vicinity. The scenario, as will now be described, demonstrates how a bicycle may be detected and its intentions determined in advance of a turn being executed by utilizing sensor data gathered from image sensors such as cameras of the autonomous vehicle.

In FIG. 1, a vehicle 100 is depicted. The vehicle 100 may be an autonomous vehicle. The vehicle 100 may include one or more sensors 106. The one or more sensors 106 may include one or more LIDAR sensors and one or more cameras or other image sensors. The sensors 106 may be configured to sense the environment surrounding the vehicle 100.

In the example of FIG. 1, the vehicle 100 is shown travelling along a road 102, and is travelling forwards in the direction indicated by the arrow 104. Although only a part of a road 102 is shown here for ease of description, the road 102 may continue in front of and to the rear of the vehicle 100. In FIG. 1, a scene in front of the vehicle 100, in the direction of the arrow 104, is shown in the box 108. The scene 108 shows what is in front of the vehicle 100 as may be detected at a particular point in time by an image sensor of sensors 106 facing in the direction 104.

The scene 108 depicts the road 102 as it continues in front of the vehicle 100. The scene 108 includes other road users, such as a car 110 whose rear is visible because it is directly in front of the vehicle 102. There are also several bicycles 112, 114, 116, 118 visible in the scene 108, as well as several pedestrians 120. The bicycles 112, 114, 116, 118 are travelling on the road 102. The pedestrians 120 are on a sidewalk 122 next to the road 102.

In general, a vehicle, such as vehicle 100, may travel along one or more roads, such as road 102 as part of an external environment that the vehicle is configured to navigate. The vehicle may encounter other road users, such as car 110 or bicycles 112, 114, 116, 118, or, at particular times such as when crossing a road, pedestrians 120. The vehicle may be configured to operate based on the actions and/or predicted actions of the other road users to avoid collisions and to navigate successfully from a start location to a destination.

In order to navigate successfully, the vehicle 100 may include one or more vehicle systems 124. The vehicle systems 124 in FIG. 1 may be a subset of the systems incorporated in the vehicle, with the systems 124 represented in FIG. 1 being provided for ease of explanation. Further vehicle systems are described in relation to FIG. 2 below.

The vehicle 100 may be configured to receive sensor data from the one or more sensors 106, which form part of the vehicle systems 124. The sensor data may relate to the external environment, such as scene 108. The sensor data may include data gathered using one or more LIDAR sensors, one or more radar sensors, one or more sonar sensors, one or more infrared sensors, one or more GPS sensors, one or more image sensors, and/or one or more audio sensors.

As shown in FIG. 1, the sensor data may be provided from sensors 106 to a perception component 126, which forms part of the vehicle systems 124. The perception component 126 may be configured to, based on the sensor data, detect features of the external environment and/or objects within the external environment. The perception component 126 may also be configured to classify the objects that it detects in the external environment. Further details on the perception component is provided below in relation to FIG. 2.

In FIG. 1, the perception component 126 may receive sensor data from the one or more sensors 106 relating to the scene 108. The perception component 126 may be configured to detect and classify the car 110, the bicycles 112, 114, 116, 118, and the pedestrians 120. The perception component 126 may be configured to generate a visualization of the scene 108 using the sensor data. The sensor data used to generate the visualization may comprise LIDAR data received from a LIDAR sensor.

The perception component 126 may be configured to track the objects it detects using one or more bounding boxes. The bounding boxes may be applied to LIDAR, image, or other data to enable the objects to be tracked over time. The bounding boxes may be applied to image data based on other data. An example of this is shown in the box 128, in which the scene 108 is overlaid with three bounding boxes, 132, 134, and 136, corresponding to bicycles 112, 114, and 116 respectively.

In some examples, tracking of objects may be performed by associating current and earlier sensor data for the object, as described in more detail in U.S. patent application Ser. No. 16/779,576, which is incorporated by reference in its entirety herein for all purposes.

In the techniques described herein, the vehicle 100 may perform a method in order to determine intentions of bicycles, such as bicycles 112, 114, and 116. One or more vehicle systems 124, such as perception component 126, may be configured to receive sensor data, such as from the one or more sensors 106 and/or from other sensors to which the vehicle 100 has access. Based on the sensor data, the vehicle 100 may be configured to identify or detect a bicycle in the external environment that is proximate to or in the vicinity of the vehicle 100. For example, the bicycle may be detected or identified based on LIDAR data. In other words, the perception component 126 may be configured to detect and track an object in the sensor data. The perception component 126 may be configured to classify the object being tracked as a bicycle based on one or more perception models. The vehicle 100 may then identify image data corresponding to the bicycle, such as is shown in box 128.

As shown in FIG. 1, image data relating to the bicycle may comprise a scene 128 including the bicycle. Additionally, or alternatively, the perception component 126 or another component of the vehicle systems 124 may be configured to identify from the image data 128, further image data specifically related to the bicycle. In FIG. 1, this is shown for each of bicycles 112, 114, and 116, where the image data within bounding boxes 132, 134, and 136 has been extracted as image data 142, 144, and 146. In some examples, identifying or extracting such data may include expanding the bounding box by a predetermined amount or percentage and using the image data in the expanded bounding box as the image data. Expanding the bounding box may ensure that particular movements of the user of a bicycle are captured. Expanding the bounding box may also allow for additional context to be provided to the model, such as a road position of the bicycle. As will be described later, similar bounding boxes may be used when extracting data with which to train the machine-learned model that is configured to identify turning intention.

The extracted image data relating to the bicycle, such as 142, 144, and 146 may be provided to a machine-learned model 140. The machine-learned model 140 may be configured to determine intention of bicycles and other person-wide vehicles based on the image data. Although not illustrated in FIG. 1, the perception component 126 may be configured to determine the image data relating to a bicycle for more than one point in time. In other words, the image data may relate to a particular point in time or to a period of time.

The image data may be provided to the machine-learned model 140 as an input. The machine-learned model 140 may output an indication of an intention of the bicycle. The intention for the bicycle is prediction for the action of the bicycle a short time in the future, which may be between 0.5 and 2.5 seconds in the future. Accordingly, the machine-learned model 140 uses as input one or more past image frames relating to the bicycle and predicts an action for the bicycle in the future.

As shown in output 152, the machine-learned model 140 determined that the bicycle 112 intends to turn right. The user of bicycle 112 may be leaning to the right and operating their brakes, which may indicate a future intention to turn right. As shown in output 154, the machine-learned model determined that the bicycle 114 intends to travel straight. Although the bicycle 114 is currently performing a right turn, and is leaning to the right, the machine-learned model may determine a different intention. The visual data may, for example, indicate that the bicycle 114 is leaning less than when performing the turn, which may indicate, for example, the bicycle 114 is straightening up with the intention of travelling straight. As shown in output 156, the machine-learned model determined that the bicycle 116 intends to turn left. Although it is not visible in FIG. 1, the user of bicycle 140 may be turning their head to the left, to check that there is no traffic that may impede its turn. The machine-learned model 140 may be trained to identify head scanning as an indication of an intended turn.

Other bicycles, such as bicycle 118, may intend to stop. The machine-learned model may be trained to identify when a bicycle intends to stop. Although not depicted in FIG. 1, other bicycles may already be stationary, or users may be walking alongside their bicycle. The vehicle 100 may be configured to classify stationary bicycles or bicycles being walked as bicycles. The machine-learned model 140 may be trained to determine an intention of stationary bicycles or bicycles. The intention may be that the bicycle intends to remain stopped. In some examples, the intention may be that the bicycle intends to travel in a straight line, indicating that the bicycle may shortly set off and begin travelling. In some examples, a determination of the bicycle stopping may form part of an 'other intention' category that includes intentions other than turning or travelling straight ahead.

Generally, therefore, as the machine-learned model may be trained to indicate a future intention, such output may be used to determine upcoming changes in state of the bicycle. A change in state may be changing from stopped to travelling, or from travelling to stopped. A change in state may be entering or leaving a turn.

The machine-learned model 140 may be configured to determine the future intention of a bicycle relative to the direction of travel of the bicycle. This may enable the determination of intention to be independent from the orientation of the autonomous vehicle and the position of the autonomous vehicle relative to the bicycle. It may also enable the model to determine the intention regardless of the angle of the bicycle relative to the vehicle. The use of image data may enable independence of the determinations from map features or other attributes that may feature in other data or on maps and that may be used in other prediction models used by the vehicle, which may result in a greater accuracy in determining intentions of bicycles and other person-wide vehicles.

As also depicted in FIG. 1, the model 140 may also be configured to provide a confidence level associated with the intention. The confidence level may indicate a probability indicating how confident the model is in its predicted intention for the bicycle. The confidence level may be considered to represent a likelihood that the intention will be correct at a point in the future. For example, the confidence level may indicate how likely the intention is to take place. The confidence level may comprise a single score. The confidence level may comprise a score for each possible intention. For example, if turning actions are classified using four classifications, e.g., turn left, turn right, continue straight, or stopped as defined later in this description, a confidence level may be provided for each classification.

As indicated in FIG. 1, the output 152 also indicates that the confidence in the intention that the model 140 determined is 0.7, whereas output 154 has a higher associated confidence level and output 156 has a lower associated confidence level. Output 154 may have a higher associated confidence level because the bicycle 114 is already leaning and leaning may be a useful to determine entering and/or exiting a turn. Leaning may be considered a more reliable indication of entering and/or exiting a turn than, e.g., head scanning or hand gestures. Output 154 may have a higher associated confidence level because the bicycle 114 is closer to and therefore more visible to the cameras and/or other sensors of the vehicle 100. Output 156 may have a lower associated confidence level because the user of bicycle 116 may only be turning their head. If a lean or other gesture were detected, the confidence level may increase. Output 156 may have a lower associated confidence level because the bicycle 116 is further away from the vehicle 100. Output 156 may have a lower associated confidence level because the bicycle 116 may have been occluded for part of its recent trajectory by road furniture and/or other vehicles such as bicycle 114. Occlusion and distance from camera may affect confidence levels because these aspects may affect the quality of the image frames and the amount of information that may be gathered by the machine-learned model from the image frames. In some examples, which are described in more detail below, a plurality of image frames are provided to the machine-learned model because the bicycle may have been tracked for a period of time using, e.g. LIDAR data.

The plurality of frames may enable more accuracy in the predicted future intention and may allow for the effects of temporary occlusions and/or distance to be reduced.

Although only image data from a single camera is shown in FIG. 1, in other examples, data from more than one image sensor may be used as input for the model 140, and/or to determine a future intention of a person-wide vehicle. In some examples, first image data may be received from a first image sensor and second image data may be received from a second image sensor. The first image data may relate to the person-wide vehicle and the second image data may relate to the person-wide vehicle. The first and second image data may be determined based on perceiving the person-wide vehicle based on, e.g. other sensor data. The first image data may be provided as input to the model 140 to generate a first future intention. The second image data may also be provided as input to the model 140 to generate a second future intention. The first and second future intentions may be averaged or otherwise combined or compared to determine an overall future intention. Using image data from more than one image sensor to provide more than one output from the model that may then be used to determine an average intention may improve the accuracy in determining the intention. In some such examples, another machine-learned model may be configured to pre-process the first image data and the second image data to determine a level of occlusion or how much of the person-wide vehicle is present in the image data. Based on the level of occlusion or how much of the vehicle can be seen, one of the first and second image data may be discarded in preference for the other. For example, if it is determined that only 20% of a bicycle is visible in first image data, whereas 75% of the bicycle is visible in the second image data, the second image data may be chosen to provide as input to the model in preference to the first image data. In some examples, a threshold may be applied to determine whether a person-wide vehicle is sufficiently visible in the image data before it is provided to the machine-learned model.

Although not shown in FIG. 1, the output from the model 140 may be used by the autonomous vehicle 100 in other systems 124. For example, a planner component of the vehicle 100, configured to plan how the vehicle 100 should move through the environment, may be configured to control the vehicle 100 based on the output from the model 140. The planner may use the output alone or may use further data or indications generated based on the output of the model 140. For example, the output from the model 140 may be provided to a prediction component (also not shown) that forms part of the vehicle system 124.

The prediction component may output prediction data. The prediction component may be configured to determine prediction data including one or more trajectories for each bicycle based on the output of the model 140. The prediction component may use other sensor data to determine the one or more trajectories as well as the output from model 140. In some examples, the prediction component may, based on sensor data such as LIDAR data indicating velocity, position, and/or yaw, determine prediction data including a plurality of different predicted trajectories for the bicycle. The predicted trajectories may be weighted based on the output of model 140. The prediction component may be configured to use the output from the model 140 in determining the predicted trajectories. Alternatively, the prediction component may determine the predicted trajectories and adjust weightings, rankings, or confidence levels associated with those trajectories based on the output from the model 140. The autonomous vehicle 100 may be controlled based on the trajectory or trajectories predicted by the prediction component.

Figure 2:
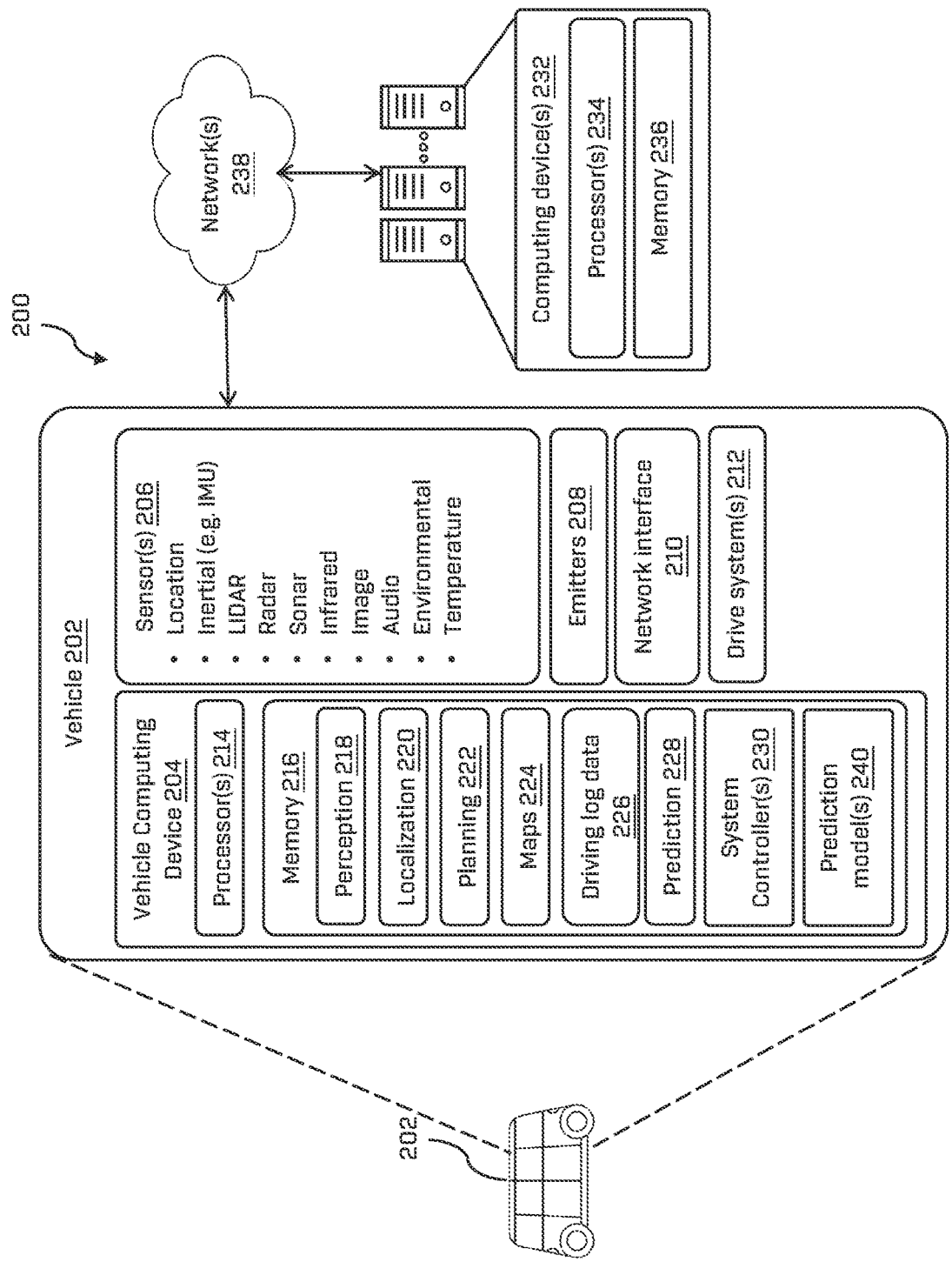
FIG. 2 is a block diagram illustrating an example vehicle system according to the present invention.

The prediction component and other vehicle systems are shown and described below in more detail in relation to FIG. 2. FIG. 2 illustrates a block diagram of an example system 200 that implements the techniques discussed herein. FIG. 2 may represent vehicle systems 124 of FIG. 1. In some instances, the example system 200 may include a vehicle 202, which may represent the vehicle 100 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification.

The vehicle 202 may include a vehicle computing device(s) 204, sensor(s) 206, emitter(s) 208, network interface(s) 210, and/or drive system(s) 212. Sensor(s) 206 may represent sensor(s) 112. The system 200 may additionally or alternatively comprise computing device(s) 232. The vehicle computing device 204 may be configured to perform the method 300 of FIG. 3 described below.

In some instances, the sensor(s) 206 may represent sensor(s) 112 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 232.

The vehicle 202 may also include emitter(s) 208 for emitting light and/or sound, as described above. The emitter(s) 208 may include interior audio and visual emitter(s) to communicate with passengers of the vehicle 202. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). The network interface(s) 210 may facilitate communication with other local computing device(s) on the vehicle 202 and/or the drive component(s) 212. The network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 232 over a network 238. In some examples, computing device(s) 232 may comprise one or more nodes of a distributed computing system (e.g., a cloud computing architecture).

The vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 214 and memory 216 communicatively coupled with the one or more processors 214. Computing device(s) 232 may also include processor(s) 234, and/or memory 236. The processor(s) 214 and/or 234 may be any suitable processor capable of executing instructions to process data and perform operations as described herein. By way of example and not limitation, the processor(s) 214 and/or 234 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 216 and/or 236 may be examples of non-transitory computer-readable media. The memory 216 and/or 236 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 216 and/or memory 236 may store a perception component 218, localization component 220, planning component 222, map(s) 224, driving log data 226, prediction component 228, and/or system controller(s) 230—zero or more portions of any of which may be hardware, such as GPU(s), CPU(s), and/or other processing units.

The perception component 218 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 218 is referred to as perception data. The perception component 218 may be configured to associate a bounding region (or other indication) with an identified object. The perception component 218 may be configured to associate a confidence score associated with a classification of the identified object with an identified object. In some examples, objects, when rendered via a display, can be colored based on their perceived class. The object classifications determined by the perception component 218 may distinguish between different object types such as, for example, a passenger vehicle, a pedestrian, a bicyclist, motorist, a delivery truck, a semi-truck, traffic signage, and/or the like.

In at least one example, the localization component 220 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 220 may include and/or request/receive map(s) 224 of an environment and can continuously determine a location, velocity, and/or orientation of the autonomous vehicle 202 within the map(s) 224. In some instances, the localization component 220 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 220 may provide data to various components of the vehicle 202 to determine an initial position of an autonomous vehicle for generating a trajectory and/or for generating map data, as discussed herein. In some examples, localization component 220 may provide, to the perception component 218, a location and/or orientation of the vehicle 202 relative to the environment and/or sensor data associated therewith.

The planning component 222 may receive a location and/or orientation of the vehicle 202 from the localization component 220 and/or perception data from the perception component 218 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 230 and/or drive component(s) 212 may parse/cause to be carried out, second instructions for the emitter(s) 208 may be formatted according to a second format associated therewith).

The driving log data 226 may comprise sensor data and perception data collected or determined by the vehicle 202 (e.g., by the perception component 218), as well as any other message generated and or sent by the vehicle 202 during operation including, but not limited to, control messages, error messages, etc. In some examples, the vehicle 202 may transmit the driving log data 226 to the computing device(s) 232. In some examples, the driving log data 226 may comprise (historical) perception data that was generated on the vehicle 202 during operation of the vehicle.

The prediction component 228 may generate one or more probability maps representing prediction probabilities of possible locations of one or more objects in an environment. For example, the prediction component 228 may generate one or more probability maps for vehicles, pedestrians, animals, and the like within a threshold distance from the vehicle 202. In some examples, the prediction component 228 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 222 may be communicatively coupled to the prediction component 228 to generate predicted trajectories of objects in an environment. For example, the prediction component 228 may generate one or more predicted trajectories for objects within a threshold distance from the vehicle 202. In some examples, the prediction component 228 may measure a trace of an object and generate a trajectory for the object based on observed and predicted behavior. Although prediction component 228 is shown on a vehicle 202 in this example, the prediction component 228 may also be provided elsewhere, such as in a remote computing device. In some examples, a prediction component may be provided at both a vehicle and a remote computing device. These components may be configured to operate according to the same or a similar algorithm.

The memory 216 and/or 236 may additionally or alternatively store a mapping system, a planning system, a ride management system, etc. Although perception component 218 and/or planning component 222 are illustrated as being stored in memory 216, perception component 218 and/or planning component 222 may include processor-executable instructions, machine-learned model(s) (e.g., a neural network), and/or hardware.

The memory 216 may store one or more prediction models 240 that may be used for trajectory determination or, as described herein, determining turning intention of person-wide vehicles. The one or more prediction models 240 may include, for example, model 140 of FIG. 1.

As described herein, the localization component 220, the perception component 218, the planning component 222, the prediction component 228, the prediction model(s) 240 and/or other components of the system 200 may comprise one or more ML models. For example, the localization component 220, the perception component 218, the planning component 222, the prediction component 228 and/or the prediction model(s) 240 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SEC- OND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 230, which may be configured to control steering, propulsion, braking, safety, emitters, communication, and other systems of the vehicle 202. These system controller(s) 230 may communicate with and/or control corresponding systems of the drive component(s) 212 and/or other components of the vehicle 202.

It should be noted that while FIG. 2 is illustrated as a distributed system, in alternative examples, components of the vehicle 202 may be associated with the computing device(s) 232 and/or components of the computing device(s) 232 may be associated with the vehicle 202. That is, the vehicle 202 may perform one or more of the functions associated with the computing device(s) 232, and vice versa.

Figure 3:
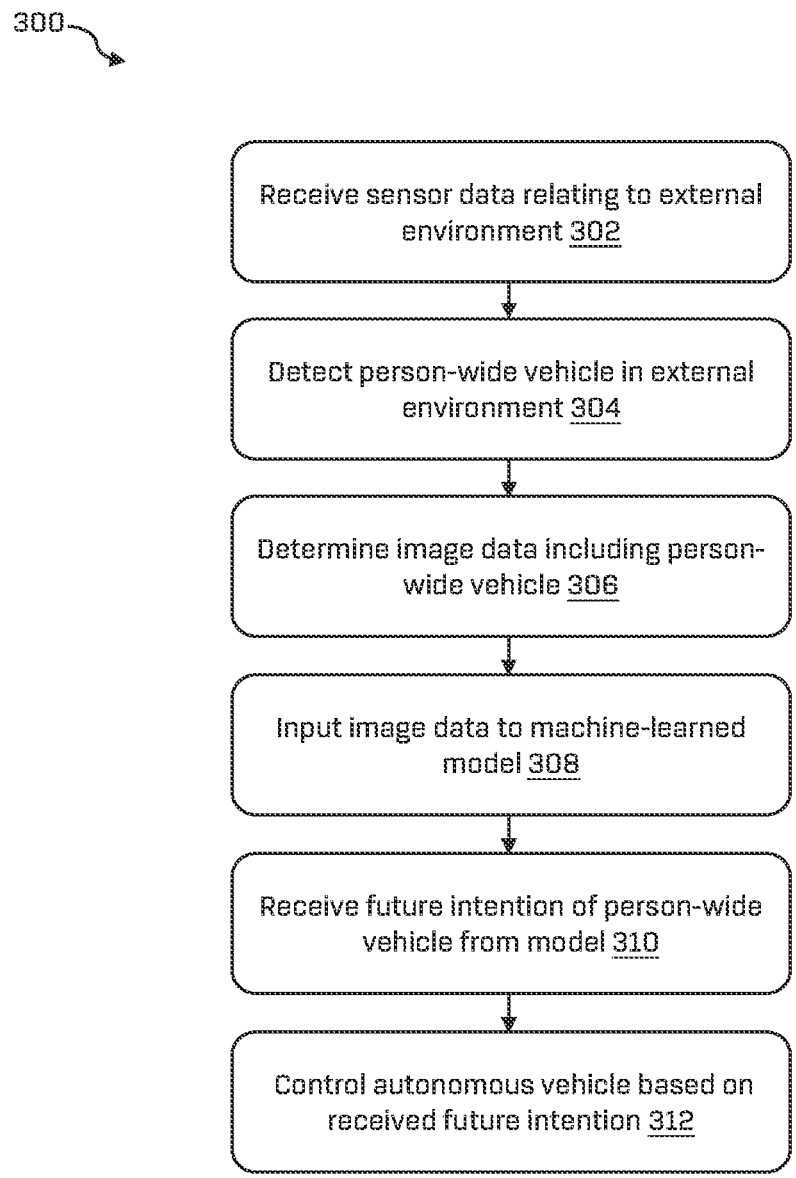
FIG. 3 depicts a flow chart of a process for determining future intention of bicycles according to the present invention.

What is described in FIG. 1 may be depicted as a flow chart. FIG. 3 provides an exemplary flow chart that describes a generalized method 300. The method 300 may be performed by an autonomous vehicle.

In FIG. 3, the method 300 may comprise, at step 302, receiving sensor data relating to an external environment of the autonomous vehicle. The sensor data may be received from one or more sensors of the autonomous vehicle. The one or more sensors may include one or more sensors mounted to the autonomous vehicle. The one or more sensors may include one or more sensors associated with the autonomous vehicle, wherein the autonomous vehicle has access to the sensor data gathered by those sensors. For example, an autonomous vehicle may be part of a fleet of autonomous vehicles, with each autonomous vehicle having a suite of sensors. The autonomous vehicle may have access to sensor data gathered by one or more other autonomous vehicles of the fleet. The sensor data may be from one or more autonomous vehicles that are proximal to the autonomous vehicle, i.e., within a particular distance or radius of the autonomous vehicle. The sensor data may be accessed directly from the other autonomous vehicle, may be shared between the autonomous vehicles, or may be accessed remotely from a server storing data from some or all autonomous vehicles of the fleet.

At step 304, the method 300 can comprise detecting a person-wide vehicle in the external environment and that is proximate to the autonomous vehicle. The detection may be based on the sensor data. For example, the sensor data may include LIDAR data, and the person-wide vehicle may be detected based on the LIDAR data. As described above, a perception component, such as perception components 126 or 218, may be configured to parse sensor data to detect objects in the external environment. The perception component or a part thereof may be configured to detect person-wide vehicles such as bicycles in the external environment.

In particular examples, detecting a person-wide vehicle may include tracking, based on the sensor data, an object in the external environment, and classifying the object as a person-wide vehicle. The object may be tracked for a period of time before it is classified as a person-wide vehicle. The object may be classified by assigning a label to it. The label may indicate that it is a person-wide vehicle or a vehicle that falls within the group of person-wide vehicles. Based on assigning a label corresponding to a person-wide vehicle, the next steps of the method may be performed. In other words, step 306 may be dependent upon labelling the object as a bicycle.

In some examples, the person-wide vehicle may be detected based on image data. The image data may be from a first image sensor, while the image data used in step 306 below may be from a second, different image sensor.

At step 306, the method 300 can comprise determining image data including the person-wide vehicle. The image data may be determined based on the sensor data. The sensor data may comprise the image data. The image data may be determined based on the detected person-wide vehicle. The image data can be determined based on detecting the person-wide vehicle in the sensor data. For example, upon detecting a person-wide vehicle in the sensor data such as LIDAR data, corresponding image data may be determined that includes the person-wide vehicle. The corresponding image data may comprise image data that is contemporaneous with the LIDAR data. The sensor data may therefore be received from two different sensors. The two different sensors may have different modalities.

The corresponding image data may comprise image data that is in the past. For example, where an object is tracked based on the sensor data and subsequently classified as a person-wide vehicle, the image data may include image frames that correspond to when the object was being tracked before being classified. The object may have an associated tracking identifier. Based on the tracking identifier, upon identifying that the object is a person-wide vehicle, the tracking identifier may be used to identify image data corresponding to the person-wide vehicle at the present time and at one or more earlier points in time. The earlier points in time may be determined within a predetermined period prior to the current point in time. As the person-wide vehicle continues to be tracked, a moving window approach may be implemented so that the image data is updated based on the current time and the predetermined period. The image data may be obtained from a cache or buffer configured to store recent image data.

In some examples, the corresponding image data may comprise image data that is in the future. In other words, upon determining the person-wide vehicle in the LIDAR data, the person-wide vehicle may be tracked in subsequent image data. In some examples, the person-wide vehicle may be tracked using LIDAR data and image data having the same or a similar timestamp as the LIDAR data may be determined. Although the person-wide vehicle is described as being detected using LIDAR data in the above examples, in other examples other sensor data may be used to detect the person-wide vehicle. Accordingly, the data in step 304 may be referred to as first sensor data, while the data in step 306 may be referred to as second sensor data. The second sensor data includes visual or image data.

In some examples of steps 304 and 306, the person-wide vehicle may be detected based on image data in step 304 and at step 306 the image data and any other image data that includes the person-wide vehicle may be determined. In some examples, the person-wide vehicle may be initially detected in step 304 and tracked in subsequent image data at step 306.

As described above, the image data determined in step 306 may comprise image data from two different image sensors.

At step 308, the method 300 may include inputting the image data to a machine-learned model. The image data may comprise one or more image frames. The machine-learned model may be configured to receive, as input, a predetermined amount of image data, such as a predetermined number of image frames. In some examples, the machine-learned model may be configured to receive, as input, ten image frames. In other examples, fewer or more image frames may be used. The image data determined at step 306 may comprise the predetermined number of image frames. The image data determined at step 306 may be sampled to determine the predetermined number of image frames. Because the person-wide vehicle is moving in real time relative to the autonomous vehicle, it may be useful to enable fast, real-time processing. Accordingly, sampling the image data may result in less data to be provided to the model, and therefore a faster output from the model. The sampling rate may be chosen to optimize the speed of analysis by the model relative to accuracy of the output.

Based on the image data and sensor data used in steps 304 and 306, a bounding box may be applied to the person-wide object in at least one image frame of the image data. The bounding box may be an initial, tracking bounding box. The image data may be cropped to the bounding box. Alternatively, a first bounding box may be applied to the person-wide object in the image data and the first bounding box may be expanded to provide a second bounding box having a larger area than the first bounding box. The image frame may be cropped to the second bounding box. Expanding the bounding box to include more information in this way may enable additional context to be included that the machine-learned model may be able to use to determine a future intention. For example, the expanded second bounding box may allow the use of a road positioning of the person-wide vehicle to be used in determining the future intention by the machine-learned model.

Where image data from more than one image sensor is determined at step 306, image data from each sensor may be provided to the model or image data from only a subset of the sensors may be provided to the model.

The machine-learned model may be trained based on sensor data extracted from log data. The extracted sensor data may include image data. The extracted sensor data may include LIDAR data. The extracted sensor data may represent further person-wide vehicles and may include corresponding actions performed by those further person-wide vehicles. The actions may be determined based on velocity and/or yaw measurements. The actions may be determined based on position measurements. Velocity and/or yaw may be determined based on position of a person-wide vehicle at more than one points in time. A label or classification may be assigned to the action. Visual data corresponding to the action may be identified. Examples of how the image data may be extracted and used to train the machine-learned model is described in relation to FIG. 4 and FIG. 5. An example machine-learned model is described in relation to FIG. 6 below.

At step 310, the method 300 may include receiving a future intention of the person-wide vehicle. The intention may be determined by the machine-learned model. The intention may be based on the image data. The intention may indicate a predicted left turn by the person-wide vehicle, a predicted right turn by the person-wide vehicle, a prediction that the person-wide vehicle will travel straight, or a prediction that the person-wide vehicle will be stationary. An intention that the person-wide vehicle will be stationary may include the person-wide vehicle travelling at a speed below a speed threshold to encompass, for example, a bicycle being walked rather than ridden.

The intention may represent a prediction of an action that the person-wide vehicle will take place in the future. The intention may be a prediction for the action between 0 and 5 seconds in the future. This may be referred to as the immediate future. While the intention is a prediction for a future action, the image data and other sensor data used as part of the method is from prior to the action. This data may be from between 0 to 5 seconds before the determination. This may be referred to as the immediate past. In other words, past visual data may be used in the method to determine future actions of bicycles, scooters, motorcycles, and other person-wide vehicles. As will be described below, the future prediction based on past data may be used to implement control in the present. In some examples, as described above, a confidence level may be provided by the machine-learned model in addition to the intention.

Where image data from more than one image sensor is provided to the machine-learned model, the model may provide as output at step 310 a future intention corresponding to the image data from each image sensor. Subsequently, one or more functions or operations may be performed on the future intentions to determine an overall future intention.

At step 312, the method 300 may include controlling the autonomous vehicle based on the received intention. For example, the autonomous vehicle may be controlled to give right of way to the person-wide vehicle. In other examples, the autonomous vehicle may be controlled to prevent a particular operation until the person-wide vehicle has performed the intended action. For example, the intention may indicate that the person-wide vehicle is predicted to travel straight ahead. This may correspond to a trajectory for the person-wide vehicle that passes one or more doors of the autonomous vehicle. The autonomous vehicle may be configured to prevent operation of the one or more doors in dependence on the intention. The autonomous vehicle may be configured to prevent operation of the one or more doors until the person-wide vehicle has passed the autonomous vehicle so as not to endanger the user of the person-wide vehicle and/or the occupants of the autonomous vehicle. In some examples, the autonomous vehicle may be configured to generate and emit one or more alert signals to the person-wide vehicle and/or to occupants of the autonomous vehicle in dependence on the determined intention. The alert signals may be emitted using emitters of the autonomous vehicle, such as emitters 208. The alert signals may include sound alerts and/or light alerts.

Other steps may be included in the method 300. For example, the intention received at step 310 may be used to determine one or more further parameters. For example, the intention may be provided to a planning component, such as planning component 222, and/or to a prediction component, such as prediction component 228.

In a particular example, a prediction component may be configured to determine, based on the sensor data, one or more predicted trajectories for the person-wide vehicle. The one or more predicted trajectories may represent predictions of the path that the person-wide vehicle will take based on position, yaw, velocity, and/or other parameters. The intention received at step 310 may be provided to the prediction component. The prediction component may be provided with the intention and may determine the one or more predicted trajectories based on the intention. In some embodiments, the perception component may determine more than one predicted trajectory. The predicted trajectories may be determined prior to receiving the intention. Each of the predicted trajectories determined by the perception component may have at least one associated confidence level indicating a likelihood that the person-wide vehicle will follow that predicted trajectory. The prediction component may be configured to adjust the confidence level of at least one of the predicted trajectories based on the intention. In some examples, the prediction component may apply a weighting to the confidence level of at least one of the predicted trajectories based on the intention. The prediction component may then determine a predicted trajectory for the person-wide vehicles based on the confidence levels.

The intention may be stored as log data in a memory of the autonomous vehicle, such as memory 216, and/or in remote memory, such as in the memory 236 of remote computing device 232. The intention may be stored with at least part of the image data and/or other sensor data. The autonomous vehicle and/or a remote computing device may be configured to determine the resulting action performed by the person-wide vehicle detected in the sensor data. A determination may be made based on the intention and the resulting action as to a degree of accuracy of the machine-learned model. The determination may include an error value and/or a correlation value. The determination may be used as feedback to adjust one or more parameters of the machine-learned model. The machine-learned model may be iteratively improved in this way. Iteration may occur locally at the vehicle based on each determined turning intention. Iteration may be performed centrally for a fleet of vehicles by a remote server based on log data gathered from the fleet of vehicles.

Figure 4:
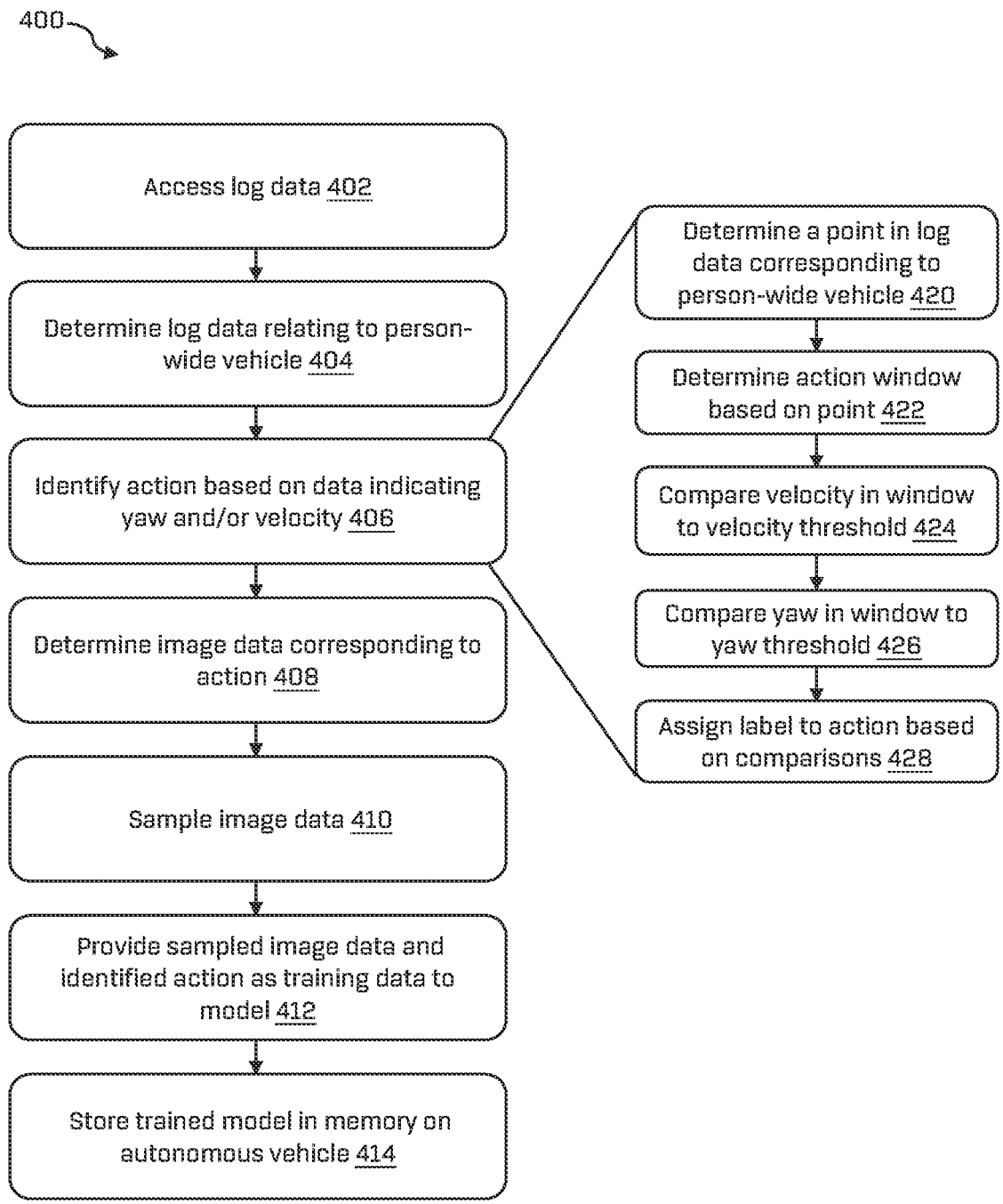
FIG. 4 is a flow chart of a process for training a machine-learned model according to the present invention.

FIG. 4 provides an exemplary flow chart that describes a method 400. The method 400 may be considered to be a method of training a model to yield the machine-learned model used in the method of FIG. 3. The method 400 may be performed be a remote server, such as remote computing device 232, using log data stored in memory, such as memory 236.

Generally, as will be described below, log data may be used to identify data relating to person-wide vehicles. It may then be determined whether those person-wide vehicles are turning in the data forming the log data. Image data may be determined in the log data that corresponds to the person-wide vehicle. The image data may be image data from before the turning action. The image data may be sampled. The image data may be stored as training data. The training data may be used to train a model, which, once trained, may be stored in memory at an autonomous vehicle.

In FIG. 4, at step 402, the method 400 may comprise accessing log data. The log data may comprise raw sensor data. In other words, the log data may include data gathered by one or more sensors of one or more autonomous vehicles. The log data may include data determined by one or more components of the vehicle. The log data may be stored in a hierarchical data structure as described in more detail in U.S. patent application Ser. No. 16/219,623, which is incorporated by reference in its entirety herein for all purposes.

At step 404, the method 400 can include determining log data relating to a person-wide vehicle. The log data may relate to an external environment through which an autonomous vehicle or a test vehicle traversed. The log data may include object data identifying objects within the external environment. The object data may indicate an object type for each object. The log data may be determined by filtering based on object type. In some examples, step 404 may include performing analysis on the log data to identify person-wide vehicles therein and selecting data including person-wide vehicles based on object type. The log data may include LIDAR data or other sensor data. In some examples, the log data may include visual data and the visual data may be used to determine a person-wide vehicle. In other examples, the data used to determine the person-wide vehicle may be from a sensor having a different modality to the image sensor used to capture image data used in step 408 below.

At step 406, the method may include identifying an action performed by the person-wide vehicle based on the determined log data. The action may be identified based on a yaw and/or a velocity of the person-wide vehicle. The log data may include yaw and/or velocity data. The log data may include position data for at least a first and second time point from which yaw and/or velocity data may be determined. In addition to turns, such as left or right turns, actions may include the person-wide vehicle travelling straight, or becoming stationary. The identification may be made with reference to one or more velocity thresholds and/or one or more yaw thresholds.

Although the process for identifying an action as described in step 406 and the subsequent step of determining image data 408 are described in more detail in relation to FIG. 5 below, FIG. 4 also includes a set of example steps, which are numbered 420, 422, 424, 426, and 428, that may form part of or be included in the method 400 in addition to step 406.

In step 420, a point in time in the log data that corresponds to the person-wide vehicle may be identified. The point may be a point in time along a trajectory taken by the person-wide vehicle. The point may be a point in time within the log data when the person-wide vehicle is stationary. The point may be a point from a plurality of points in time corresponding to the person-wide vehicle. For example, each time the method 400 is performed, a next point in time may be selected and the action identified based on this point in time. Accordingly, a sliding window may be used to repeat the method 400 for the same person-wide vehicle over a period of time.

At step 422, based on the point in the log data, an action window may be determined. The action window may relate to a period of time between the point in time identified at step 420 and a later point in time. The action window may have a predefined duration. The action window may have a duration over which an action is expected to be performed.

Based on the action window 422, a velocity and/or yaw of the person-wide vehicle between the points in time between which the window extends may be determined. More than one velocity and/or yaw may be determined for the person-wide vehicle within the window. The velocity and/or yaw may be compared to respective velocity and yaw thresholds as indicated by steps 424 and 426. In some examples, a high threshold and a low threshold may be defined for one or both of velocity and yaw.

Based on the comparisons at steps 424 and 426, an action may be identified. The action may be assigned a label or classification based on the comparisons at step 428. The classification may indicate whether the action performed within the window was the person-wide vehicle performing a left turn, the person-wide vehicle performing a right turn, the person-wide vehicle travelling straight, or the person-wide vehicle being stopped.

The 'stopped' classification may include actions that may not be classified as 'left turn', 'right turn', or 'straight'. For example, the 'stopped' classification may include where person-wide vehicles are stationary, being walked (in the case of bicycles and similar vehicles), or are coming to a stop. Accordingly, actions falling in the 'stopped' classification may be defined based on the velocity threshold, and specifically as being actions whose velocity is lower than the velocity threshold. The velocity may be determined between a first time and a second time. Actions falling in the 'left turn', 'right turn', and 'straight' classifications may have velocities higher than the velocity threshold. In some examples, actions in the 'stopped' classification may be lower than a low velocity threshold, while actions in the 'left turn', 'right turn', and 'straight' classifications may have velocities higher than a high velocity threshold, the high velocity threshold being greater than the low velocity threshold.

To distinguish between 'left turn', 'right turn', and 'straight', one or more yaws of the person-wide object may be determined and compared to one or more yaw thresholds. In a particular example, the 'straight' classification, which may include examples where the person-wide vehicle is continuing forward down a road without turning, may be determined as actions where one or more absolute yaw values for the person-wide object are below a yaw threshold. In some examples, a first yaw, between a first and second time point, may be determined and compared to the yaw threshold. In some examples, a second yaw, between the second time point and a third time point may be determined and compared to the yaw threshold. The first and second time points may be one second apart, and the second and third time points may be between one second apart, so that an action is defined over a period of two seconds. In other examples, the time between first and second time points and the second and third time points may be longer or shorter in duration than one second.

'Left turn' and 'right turn' actions may be actions in which one or more absolute yaw values of the person-wide object are above the yaw threshold. To distinguish between 'left turn' and 'right turn' actions, it may be determined whether the yaw value, i.e., the non-absolute value or signed integer, is positive or negative. This may be achieved by determining whether the yaw value is above or below zero. Depending on the definitions used for left and right turns, a negative yaw may correspond to one of the left turn or right turn and a positive yaw may correspond to the other of the left turn or right turn. The first and second yaw may be used to determine left and right turns also.

In some examples, a high yaw threshold and a low yaw threshold may be defined. Actions whose one or more absolute yaw values do not exceed the low yaw threshold may be placed in the 'straight' classification, whereas actions whose one or more absolute yaw values exceed the high yaw threshold may be placed in the 'left turn' or 'right turn' classification. Where high and low yaw or velocity thresholds are used, actions whose yaw and/or velocity falls between the corresponding high and low thresholds may be disregarded and not used in the rest of the method. Using a high and a low threshold for velocity and/or yaw therefore ensures that only actions that may be clearly distinguished as being in one of the classifications are provided as training data to the model. In other examples, in which more or fewer classifications are used, high and low thresholds may be used for the same purpose.

In some examples, turns and travelling straight may be differentiated using curve analysis such as regression or by determining curve radius over a period of time. In some examples, different kinds of turns may be differentiated. For example, shallow turns may be differentiated from sharp turns. Curve radius and/or other forms of analysis may be used to differentiate between different forms of turn. Different yaw thresholds may be applied to differentiate between different forms of turn.

At step 408, the method may include determining image data corresponding to the turn (or other action) identified in step 406. The image data corresponding to the action may comprise image data of the action. For example, if the action is determined between a first time point and a second or third time point, the image data may be determined between those two points. In other words, the image data may be determined for the action window as determined based on point 422.

In some examples, image data may be determined prior to the identified action. For example, if the action may be defined as beginning at a first time point, as defined in step 420, for example, then image data may be determined between a fourth time point and the first time point, wherein the fourth time point is earlier than the first time point. The fourth time point may be between, for example, 0.5 and 2 seconds earlier than the first time point. In some examples, a pre-action window may be defined between the fourth and first time points and based on the pre-action window corresponding image data may be determined. In some examples, the image data may comprise image data from before the identified action and corresponding to the identified action. Accordingly, the image data may show images of the person-wide object in the build-up to the action and/or while performing the action. Identifying data prior to the determined action enables image data to be provided to train the model that includes visual cues from users of the person-wide vehicles and/or the person-wide vehicles themselves. Accordingly, the model may be trained to identify turns and other actions before they occur, meaning that pre-emptive action may be taken by the autonomous vehicle and/or its systems.

Generally, therefore, it can be considered that the action and image data are determined relative to a point in time in the log data, with the action being identified based on log data in the future, relative to the point in time, and the image data being determined in the past, present, or future, relative to the point in time.

Figure 5:
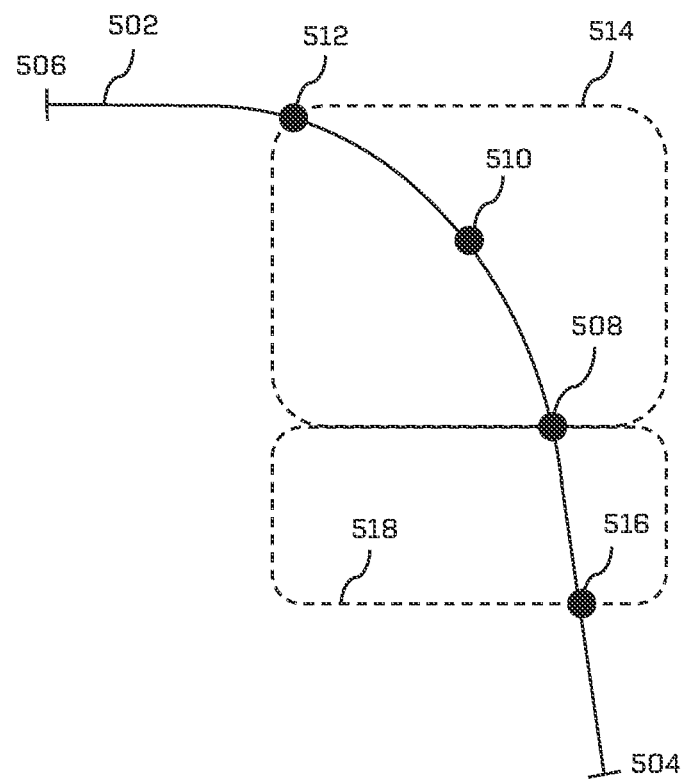
FIG. 5 is a schematic diagram of how log data is determined for training a machine-learned model according to the present invention.

A visual representation of steps 406 and 408 is provided in FIG. 5. FIG. 5 shows a trajectory 502 that may have been followed by, for example, a bicycle. The trajectory 502 may have been followed by the bicycle from start point 504 to end point 506. When following the method 400 of FIG. 4, at step 404 data relating to the bicycle may have been identified, which data includes the trajectory 502. The trajectory 502 may comprise a plurality of individual positions. For clarity, the trajectory 502 is represented as a smooth curve in FIG. 5. Based on the log data, a first time point 508, a second time point 510, and a third time point 512 may be determined. Based on the first, second, and third time points 508, 510, 512, a left turn may have been identified at step 406 of the method 400 because the velocity between points in time 508 and 510 and between points 510 and 512 exceeded a velocity threshold and because the absolute yaw between points 508 and 510 and between points 510 and 512 exceeded a yaw threshold and the sign of the yaw indicated a left-hand turn. Accordingly, the first and third points in time 508, 512 may define an action window, which is here represented as a dashed box 514. The action window 514 may be considered to represent the left turn over a first period of time, the first period of time being between the first and third points in time 508 and 512. Subsequently, a second period of time prior to the first period of time and having a predetermined size may be determined. The second period of time may begin at a fourth point in time 516 and ends at the first point in time 508. The fourth and first periods of time 516, 508 may define a pre-action window, which is here represented as a dashed box 518. The pre-action window 518 may be considered to represent the second period of time. The second period of time may be determined during step 408 or prior to it. At step 408 of the method 400, image data may be determined corresponding to the turn. The image data may be determined for the second period of time at least, and may be determined for the first period.

Returning now to FIG. 4, at step 410, the method 400 may include sampling the image data determined at step 408. Sampling the image data may comprise sampling one or more image frames from the image data. A predetermined number of frames may be determined by sampling. The image data may be sampled uniformly so that the predetermined number of frames are spaced apart by a similar or the same period of time. In some examples, the image data may be sampled at a higher rate in the period preceding the turn (i.e., between the fourth and first points in time) and at a lower rate in the period in which the turn is performed. Sampling in this way may improve the ability of the model to determine gestures, leaning, movements, and other visual cues that precede a turn. Sampling is useful in this method as it reduces the amount of data to be provided to and analyzed by the machine-learned model. This in turn improves the speed at which the machine-learned model may be trained. In some examples, a sliding window may be used over the image data to provide the training data.

In some examples, the image data determined at step 408 may be altered to include the person-wide object and a small area around them. This may be achieved by applying a bounding box to the person-wide vehicle within the image data, in a similar way to the bicycles and the image data thereof described in relation to FIG. 1. This cropping or other alteration may be performed before or after step 410. The bounding box may include the person-wide vehicle and may also include some of the external environment around the person-wide vehicle.

At step 412, the method 400 may include providing the sampled image data and the corresponding intention, i.e., what the action was classified as in step 406, as training data to the model. In other words, the model may be trained based on the training data.

At step 414, the method 400 may include storing the trained machine-learned model in the memory of an autonomous vehicle. The machine-learned model may be stored on the autonomous vehicle and configured to receive input and provide output in line with steps 308 and 310 of method 300 in FIG. 3.

The method of FIG. 4 may be repeated for a plurality of different person-wide vehicles and/or actions to develop the training data for the model. The image data gathered for the person-wide vehicles on which the model may be trained may include data captured from different angles relative to the person-wide vehicles to ensure that the model is able to determine intentions regardless of the relative locations of the autonomous vehicle and person-wide vehicle.

Using the above method 400, with or without step 414, training data may be gathered and used to yield a machine-learned model. Using the training data, the machine-learned model is trained to determine the intention of a person-wide vehicle for which image data is input, and particularly whether the person-wide vehicle intends to turn left, turn right, continue straight ahead, or perform another action. The machine-learned model is trained on data extracted from log data, and the image data used for training is provided before an action is performed, meaning that attributes that precede the action can be learnt by the model. In particular, the machine-learned model may be trained to determine the intention based on at least one attribute comprising a movement of a user of a person-wide vehicle or leaning of a user of a person-wide vehicle or of a person-wide vehicle.

Figure 6:
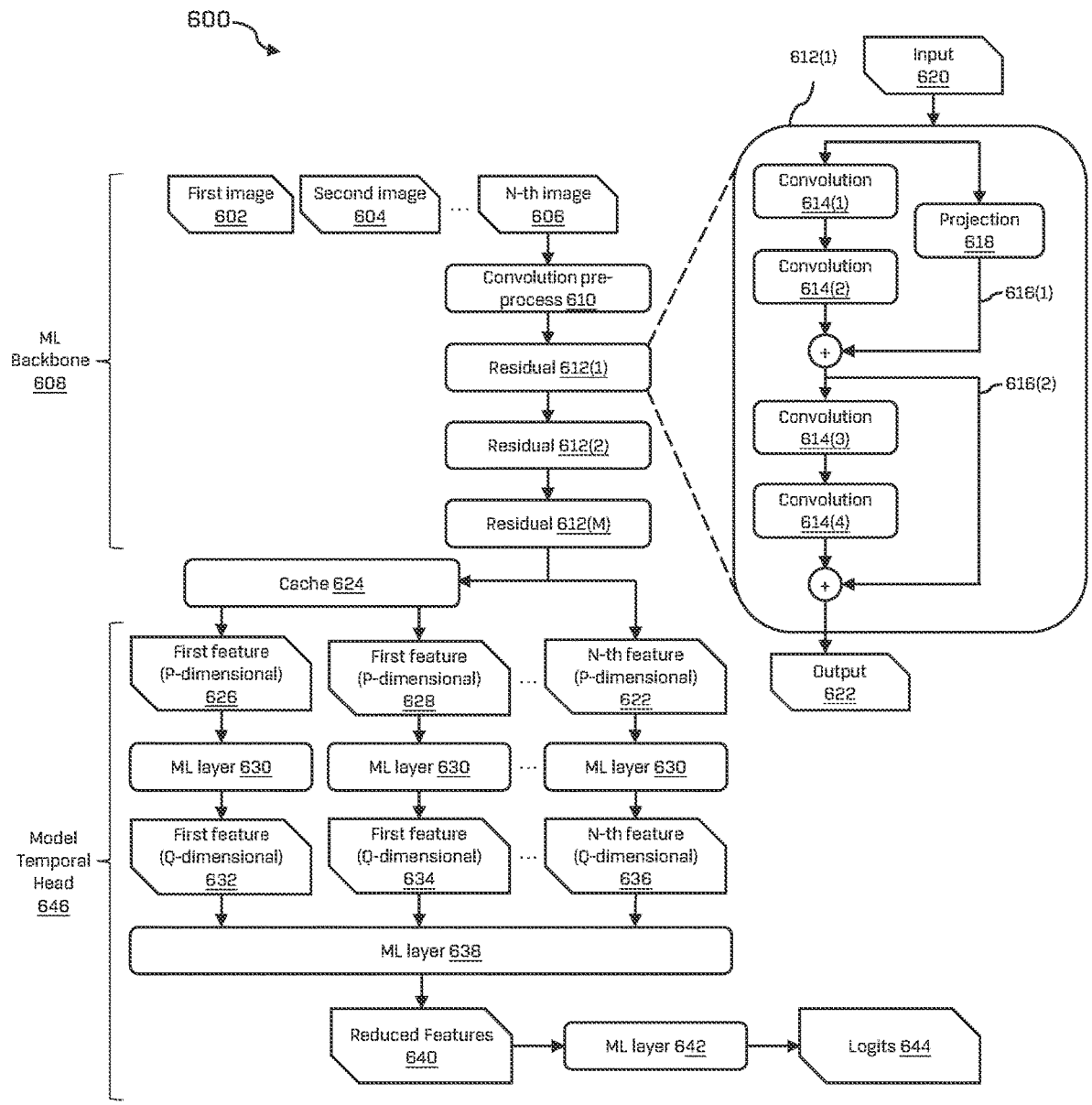
FIG. 6 is a schematic diagram of an exemplary architecture for a machine-learned model according to the present invention.

FIG. 6 illustrates an example architecture 600 of a machine-learned model, such as the machine-learned model 140, the model used in method 300, or trained in method 400. This arrangement of ML layers and cache may result in the efficiencies highlighted herein and may increase the attributes detectable by the perception component of an autonomous vehicle. The example architecture discussed herein may be appropriated to additional or alternate sensor data types beyond images, although images are discussed because of their ease of understanding. In some examples, the images discussed herein may be received from a single camera or from multiple cameras. In some examples, whatever sensor data is received, e.g., image data or point cloud data, may be received from upstream component(s) in the perception component 218. For example, the example architecture 600 may receive first image 602, second image 604, and n-th image 606, which may, for example, be image frames corresponding to a person-wide vehicle. The images 602, 604, 606 may include portions of respective images identified by an upstream component (e.g., via an ROI, instance segmentation, and/or semantic segmentation output by the upstream component) and may be related via a track output by another upstream component. The track may identify the first image 602, second image 604, and n-th image 606 as being associated with a same object. In other words, the techniques discussed herein may use a batch of n images to determine the ultimate output, which may be a classification, as discussed herein. The n images may correspond with a sliding time window of the most recent n images received from a camera.

In some examples, the example architecture 600 may be configured to handle n time steps of sensor data, where n is a positive integer. In other words, the first image 602 through the n-th image may be associated with different points in time back to n time steps in the past. The time period between each image may depend on the sensor output and upstream perception component output frequency. For example, if the interval is 500 milliseconds and n is 9, the first image 602 may be associated with a time 4 seconds in the past, the second image 604 may be associated with a time 3.5 seconds in the past, and the n-th image may be associated with a current time. Other intervals and choices of n are contemplated, e.g., 10 milliseconds, 20 milliseconds, 100 milliseconds, 250 milliseconds, 1 second, 2 seconds, etc., and n may be 2, 3, 4, 5, 10, 20, or any other number. In some examples, the time period between sensor data received may not be constant and may vary within a tolerance. For example, the system may tolerate variance between when sensor data is received, losing track of an object for a few frames (e.g., due to an occlusion), loss or corruption of a few frames, distortion of the sensor data (e.g., due to rain, glare), and/or the like. Note that n may change proportionally to the time period between time steps so that the output of the architecture 600 is current. For example, n may decrease as the interval increases in length.

In some examples, the architecture 600 may resize the n-th image 606 to a standardized size before processing the image. Additionally or alternatively, the architecture 600 may obtain a larger portion of an image than is indicated by an ROI for use as the n-th image 606.

Regardless, the most-recently received image, n-th image 606 may be provided as input to an ML backbone 608, which may comprise one or more ML layers. For example, the ML backbone 608 may be a ResNet or other suitable neural network, e.g., ResNeXt, DenseNet, vision transformer (ViT). For example, where the ML backbone 608 is a ResNet, the ML backbone may comprise a convolution pre-process layer 610 (e.g., a feedforward neural network layer) and residual layers 612(1)-($m$) where m is a positive integer. The ML backbone 608 may be used sequentially on images as they are received. In other words, the same ML backbone 608 is used on any new image that is received and the output thereof may be stored as discussed herein. Using this same ML backbone may save on training time and may reduce the system complexity, while using the output storing in the middle of the pipeline (i.e., cache 624) may reduce the computational load and processing time of the architecture 600.

A residual layer 612(1) may comprise a ResNet block, which may include various components, including convolution layers 614(1)-(4), skip-connection(s) 616(1) and (2), and projection shortcut 618, which may be part of a skip connection. These various portions may process an input 620 received from a previous layer and may generate an output 622 provided to a next layer. Note that the projection shortcut may be replaced by an identity shortcut. The projection shortcut may perform a convolution to ensure the volumes at the addition operation (at the end of the skip connection and at the output of the last convolution layer before the addition) correspond. The identity shortcut merely passes the input—it is the standard skip connection. A convolution layer 614 may include a convolution of the input to the convolution component with a trained kernel (e.g., the kernel is a portion that may be tuned via ML training), a batch normalization (e.g., see U.S. patent application Ser. No. 16/403,476, filed May 3, 2019), and, for the intermediate layers, an activation layer, such as a rectified linear unit (ReLU) layer, Gaussian error linear unit (GELU), Heaviside activation, sigmoid or hyperbolic functions (although sigmoid and tanh functions may contribute to diminishing gradients by being saturated by an input (i.e., being unable to express values over a certain amount)). In essence, this activation layer characterizes an output at a particular point in the feature data as being "on", i.e., 1.0, or "off", i.e., 0.0/activated or inactive. Note that the last convolution component 614(4) may conduct a convolution and batch normalization but may not conduct a ReLU activation.

In other words, the input to one of the residual components 612 may be convolved with a first convolutional layer, batch normalized, and put through a ReLU activation before repeating the process a second time with a second convolutional layer. The output of the second layer can be summed with the input to the residual component (or the projected version of the input where a projection layer exists in the skip connection). This process can be repeated a second time with a third and fourth convolutional layer before being output by that particular residual component.

This depicted ML backbone includes approximately 11 million trainable parameters, although it is understood that a deeper ML backbone may be used, i.e., an ML backbone with a greater number of layers, in which case the ML backbone may have 21.2 million parameters that are trainable (34 layers), 23.5 million parameters (50 layers), 42.5 million parameters (101 layers), 58.2 million parameters (152 layers), and so on. The layers may be altered (e.g., values of the kernel(s) of the convolution layers and/or projection layers or other ML layers downstream from the ML backbone) to reduce a loss computed between a logit or confidence score that is output by the ML architecture and a ground truth attribute that identifies an attribute of the object was doing. Such a ground truth attribute may be human labeled or may be labeled by a complex ML system that may be too computationally burdensome to include on the vehicle. Such an ML system may execute on a distributed computing system, such as a cloud computing system.

Ultimately, the ML backbone 608 may determine feature data associated with the n-th image 606, n-th feature data 622, which is p-dimensional, where p is a positive integer (e.g., 32, 64, depending on the number of layers in the CNN and the amount of padding in the layers). The n-th feature data 622 may be stored in a cache 624. Feature data associated with the previously received images (first image 602 and second image 604) may have previously been stored in the cache 624. In other words, the ML backbone 608 may have previously determined first feature data 626 by processing first image 602 through the ML backbone 608 and second feature data 628 by processing the second image 604 through the ML backbone 608. The first image 602 and second image 604 (and any other intermediate images) are not re-processed upon receiving the n-th image 606, which saves computational load. The cache 624 may be part of an integrated circuit that includes the ML architecture 600 although, in additional or alternate examples, the cache 624 may be a cache of a graphics processing unit, central processing unit, gate array, or the like.

In some examples, the feature data may comprise a feature map, also called an activation map, that is a result of the convolution of the kernels in the model backbone with the respective inputs to each layer. The feature data is typically a human-incomprehensible high dimensional data field (e.g., 56 by 64 dimensions, 28 by 128 dimensions, or the like), such as a tensor. In other words, the feature data is a computer and/or neural network transformation.

Based at least in part on receiving the n-th feature data 622, the ML architecture 600 may provide the first feature data 626, second feature data 628, n-th feature data 622, and any intervening feature data associated with any other images between the first and n-th image as input to an ML layer 630. In some examples, a single ML layer 630 is used at this stage for each feature data, although it's contemplated that more ML layers 630 may be used. In other words, the ML layer 630 may process first feature data 626 through the n-th feature data 622 separately to produce first feature data 632, second feature data 634, through the n-th feature data 636, all of which may be q-dimensional, where q is a positive integer greater than p. For example, q may be 128 if p is 32.

The feature data output by the ML layer 630 (i.e., first feature data 632 through n-th feature data 636) may be concatenated together and provided as input to ML layer 638, which may be designed to reduce the dimensionality of the concatenated feature data, which may be of the size nq. The ML layer 638 may project the concatenated feature data from an nq dimension into a q-dimensional space, achieving reduced features 640. For example, if q is 128 and n is 5, the concatenated feature data may have a dimensionality of 640 and the reduced features 640 may have a dimensionality of 128.

The reduced features 640 may be provided as input to a final ML layer 642, which may include output heads equal to the number of attributes predicted by the ML architecture. For example, if the ML architecture 600 is configured to predict 10 attributes, ML layer 642 may have 10 output heads, although any other number of attributes is contemplated, e.g., 2, 3, 4, 5, 10, 15, 20, etc. In some examples, an output head of the ML layer 642 may be associated with a particular attribute that is being predicted and may output a logit indicating a probability that the detected object has the attribute associated with the head. The ML layer 642 may output these logits 644 in association with the different attributes and/or the ML layer 642 may include a sigmoid, tanh, ReLU, GELU, or the like layer after the output heads or some other layer to transform the logits 644 into confidence scores between 0 and 1, where 1 indicates perfect confidence that an object has a respective attribute and 0 indicates no confidence that the object has the respective attribute. The confidence score output by the example architecture 600 may be associated with a most recent time, but may be based on a window of time going back n time steps into the past (e.g., logits 644 may be associated with the n-th time step, but may be generated based on images 602-606).

The ML layers 630, 638, and 642 may each be fully connected layers with different input/output shapes. Collectively ML layers 630, 638, and 642 may make up a model temporal head 646.

Example Clauses

A: a system comprising: one or more processors; and non-transitory memory storing processor-executable instructions that, when executed by the one or more processors, cause the system to perform actions including: receiving, from a first sensor of an autonomous vehicle traversing an environment, first sensor data relating to the environment; receiving, from a second sensor of the autonomous vehicle that is different to the first sensor, the second sensor data comprising visual data relating to the environment; identifying, based on the first sensor data, a single-track vehicle in the environment in the vicinity of the autonomous vehicle; determining, based on the first sensor data and the second sensor data, a portion of visual data corresponding to the single-track vehicle; providing the portion of the visual data as an input to a machine-learned model trained to determine a predicted turning action of single-track vehicles; receiving, from the machine-learned model, a predicted turning action for the single-track vehicle based on the second sensor data; and controlling the autonomous vehicle based on the predicted turning action.

B: the system as clause A describes, wherein the single-track vehicle is a vehicle that leans when turning and/or has external controls.

C: the system as clause A or clause B describe, wherein the single-track vehicle comprises a bicycle, a scooter, or a motorcycle.

D: the system as any of clauses A to C describe, wherein the system comprises an autonomous vehicle, the autonomous vehicle including the one or more processors and the memory.

E: the system as any of clauses A to D describe, wherein the system further comprises a remote system comprising: one or more further processors; and a further non-transitory memory storing processor-executable instructions that, when executed by the one or more processors, cause the remote system to perform actions including: determining log data corresponding to a further single-track vehicle; identifying, based on the log data, a turning action of the further single-track vehicle; determining, based on the log data and the turning action, further visual data corresponding to the turning action; training the machine-learned model based on at least a portion of the further visual data and the turning action; and storing the machine-learned model in the memory of the autonomous vehicle.

F: the system as any of clauses A to E describe, wherein the machine-learned model is trained by: determining log data corresponding to a further single-track vehicle; identifying, based on the log data, a turning action of the further single-track vehicle; determining, based on the log data and the turning action, further visual data corresponding to the turning action; training the machine-learned model based on at least a portion of the further visual data and the turning action; and storing the machine-learned model in the memory of the autonomous vehicle.

G: the system as clause E or clause F describe, wherein the further visual data corresponding to the turning action comprises data from before the turning action is initiated.

H: the system as any of clauses A to G describe, wherein the memory stores instructions that, when executed by the one or more processors, cause the system to perform actions including: receiving, from a third sensor of the autonomous vehicle that is different to the first sensor and the second sensor, third sensor data, the third sensor data comprising further visual data relating to the environment; determining, based on the first sensor data and the third sensor data, a portion of further visual data corresponding to the single-track vehicle; providing the portion of the further visual data as an input to a machine-learned model trained to determine a predicted turning action of single-track vehicles; receiving, from the machine-learned model, a further predicted turning action for the single-track vehicle based on the portion of the further visual data, wherein the autonomous vehicle is controlled based at least in part on the further predicted turning action.

I: the system as any of clauses A to H describe, wherein the single-track vehicle is identified at a first point in time, and wherein the portion of the visual data includes one or more image frames preceding the first point in time.

J: the system as any of clauses A to I describe, wherein the first sensor has a first modality and the second sensor has a second modality that is different from the first modality.

K: a method comprising: receiving, from one or more sensors of an autonomous vehicle, sensor data relating to an external environment of the autonomous vehicle; detecting, based at least in part on the sensor data, a person-wide vehicle in the external environment proximate to the autonomous vehicle; determining, based at least in part on the sensor data and the person-wide vehicle, image data including the person-wide vehicle; inputting the image data to a machine-learned model; receiving, from the machine-learned model based on the image data, a future intention of the person-wide vehicle; and controlling the autonomous vehicle based at least in part on the future intention of the person-wide vehicle.

L: the method as clause K describes, wherein the machine-learned model is trained based at least in part on log data, the log data including an action performed by a further person-wide vehicle and image data representing the one or more further person-wide vehicles.

M: the method as clause L describes, wherein the action performed by the further person-wide vehicle is determined based at least in part on a velocity or a yaw of the person-wide vehicle.

N: the method as clause M describes, wherein the action performed by the further person-wide vehicle is determined based at least in part on a velocity or a yaw of the person-wide vehicle between a first time and a second time that is later than the first time, and wherein at least a portion of the image data is associated with a third time that is earlier than the first time.

O: the method as any of clauses M to N describe, wherein the action performed by the further person-wide vehicle is determined by comparing the velocity and/or yaw of the person-wide vehicle to one or more thresholds.

P: the method as any of clauses L to P describe, wherein the log data is determined by one or more further autonomous vehicles.

Q: the method as any of clauses K to P describe, wherein the machine-learned model is trained to determine the future intention of the person-wide vehicle based at least in part on an attribute of the person-wide vehicle or a user of the person-wide vehicle in the image data, the attribute comprising: a head movement of the user of the person-wide vehicle; an extension of a hand or foot of the user of the person-wide vehicle; operation of one or more external controls of the person-wide vehicle by the user; or leaning of the user or person-wide vehicle.

R: the method as any of clauses K to Q describe, wherein the future intention comprises an indication that the person-wide vehicle is predicted to turn left, turn right, travel straight ahead or be stationary.

S: the method as any of clauses K to R describe, comprising receiving, from the machine-learned model, a confidence level associated with the future intention of the person-wide vehicle.

T: the method as clause S describes, comprising receiving, from the machine-learned model, a plurality of confidence levels, each confidence level associated with a different possible future intention of the person-wide vehicle.

U: the method as any of clauses K to T describe, comprising; determining, by a prediction component of the autonomous vehicle, a predicted trajectory of the person-wide vehicle based at least in part on the turning intention; and controlling the autonomous vehicle based at least in part on the predicted trajectory.

V: the method as clause U describes, comprising: determining, by the prediction component, a plurality of predicted trajectories of the person-wide vehicle and a plurality of corresponding confidence levels based at least in part on the sensor data; adjusting, by the prediction component, the corresponding confidence levels based at least in part on the future intention; and determining the predicted trajectory based at least in part on the corresponding confidence levels.

W: the method as any of clauses K to V describe, wherein the one or more sensors comprise a first sensor having a first modality and a second sensor having a second modality that is different from the first modality, and wherein the person-wide vehicle is detected in sensor data received from the first sensor and wherein the image data is determined from sensor data received from the second sensor.

X: the method as any of clauses K to W describe, wherein the image data comprises a first set of image data received from a first image sensor and the method comprises: receiving a second set of image data received from a second image sensor that is different to the first image sensor; inputting the second set of image data to the machine-learned model; receiving from the machine-learned model based on the second set of image data, a further future intention of the person-wide vehicle; and determining an overall future intention based on the future intention and the further future intention, the autonomous vehicle being controlled based at least in part on the overall future intention.

Y: one or more non-transitory computer-readable media storing instructions executable by one or more processors, wherein the instructions, when executed, cause the one or more processors to perform operations comprising: receiving, from one or more sensors of an autonomous vehicle, sensor data relating to an external environment of the autonomous vehicle; detecting, based at least in part on the sensor data, a person-wide vehicle in the external environment proximate to the autonomous vehicle; determining, based at least in part on the sensor data, image data including the person-wide vehicle; inputting the image data to a machine-learned model; receiving, from the machine-learned model based on the image data, a future intention of the person-wide vehicle; and controlling the autonomous vehicle based at least in part on the future intention of the person-wide vehicle.

Z: the computer-readable media as clause Y describes, wherein the computer-readable media stores the machine-learned model, and wherein the machine-learned model is trained based on log data, the log data indicating an action performed by a further person-wide vehicle and including image data representing the one or more further person-wide vehicles.

AA: the computer-readable media as clause Z describes, wherein the action performed by the further person-wide vehicle is determined based at least in part on a velocity or a yaw of the person-wide vehicle.

AB: the computer-readable media as clause Z or clause AA describe, wherein the action performed by the further person-wide vehicle is determined based at least in part on a velocity or a yaw of the person-wide vehicle between a first time and a second time that is later than the first time, and wherein at least a portion of the image data is associated with a third time that is earlier than the first time.

AC: the computer-readable media as any of clauses Z to AB describe, wherein the action performed by the further person-wide vehicle is determined by comparing the velocity and/or yaw of the person-wide vehicle to one or more thresholds.

AD: the computer-readable media as any of clauses Z to AC describe, wherein the log data is determined by one or more further autonomous vehicles.

AE: the computer-readable media as any of clauses Y to AD describe, wherein the machine-learned model is trained to determine the future intention of the person-wide vehicle based at least in part on an attribute of the person-wide vehicle or a user of the person-wide vehicle in the image data, the attribute comprising: a head movement of the user of the person-wide vehicle; an extension of a hand or foot of the user of the person-wide vehicle; operation of one or more external controls of the person-wide vehicle by the user; or leaning of the user or person-wide vehicle.

AF: the computer-readable media as any of clauses Y to AA describe, wherein the future intention comprises an indication that the person-wide vehicle is predicted to turn left, turn right, travel straight ahead or be stationary.

AG: the computer-readable media as any of clauses Y to AF describe, wherein the operations comprise receiving, from the machine-learned model, a confidence level associated with the future intention of the person-wide vehicle.

AH: the computer-readable media as any of clauses Y to AG describe, wherein the operations comprise receiving, from the machine-learned model, a plurality of confidence levels, each confidence level associated with a different possible future intention of the person-wide vehicle.

AI: the computer-readable media as any of clauses Y to AH describe, wherein the operations comprise: determining, by a prediction component of the autonomous vehicle, a predicted trajectory of the person-wide vehicle based at least in part on the turning intention; and controlling the autonomous vehicle based at least in part on the predicted trajectory.

AJ: the computer-readable media as clause AI describes, wherein the operations comprise: determining, by the prediction component, a plurality of predicted trajectories of the person-wide vehicle and a plurality of corresponding confidence levels based at least in part on the sensor data; adjusting, by the prediction component, the corresponding confidence levels based at least in part on the future intention; and determining the predicted trajectory based at least in part on the corresponding confidence levels.

AK: the computer-readable media as any of clauses Y to AJ describe, wherein the one or more sensors comprise a first sensor having a first modality and a second sensor having a second modality that is different from the first modality, and wherein the person-wide vehicle is detected in sensor data received from the first sensor and wherein the image data is determined from sensor data received from the second sensor.

AL: the computer-readable media as any of clauses Y to AK describe, wherein the image data comprises a first set of image data received from a first image sensor and wherein the operations comprise: receiving a second set of image data received from a second image sensor that is different to the first image sensor; inputting the second set of image data to the machine-learned model; receiving from the machine-learned model based on the second set of image data, a further future intention of the person-wide vehicle; and determining an overall future intention based on the future intention and the further future intention, the autonomous vehicle being controlled based at least in part on the overall future intention.

While the example clauses described above are described with respect to one particular implementation, it should be understood that, in the context of this document, the content of the example clauses can also be implemented via a method, device, system, computer-readable medium, and/or another implementation. Additionally, any of examples A-AL may be implemented alone or in combination with any other one or more of the examples A-AL.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   non-transitory memory storing processor-executable instructions that, when executed by the one or more processors, cause the system to perform actions including:
   receiving, from a first sensor of an autonomous vehicle traversing an environment, first sensor data relating to the environment;
   receiving, from a second sensor of the autonomous vehicle that is different to the first sensor, second sensor data, the second sensor data comprising visual data relating to the environment;
   identifying, based at least in part on the first sensor data, a single-track vehicle in the environment in the vicinity of the autonomous vehicle;
   determining, based at least in part on the first sensor data and the second sensor data, a portion of visual data corresponding to the single-track vehicle;
   providing the portion of the visual data as an input to a machine-learned model trained to determine a predicted turning action of single-track vehicles;
   receiving, from the machine-learned model, a predicted turning action for the single-track vehicle based at least in part on the portion of the visual data; and
   controlling the autonomous vehicle based at least in part on the predicted turning action.

2. The system of claim 1, wherein the single-track vehicle comprises a bicycle, a scooter, or a motorcycle, and is a vehicle that leans when turning and/or has external controls.

3. The system of claim 1, wherein the memory stores instructions that, when executed by the one or more processors, cause the system to perform actions including:
   receiving, from a third sensor of the autonomous vehicle that is different to the first sensor and the second sensor, third sensor data, the third sensor data comprising further visual data relating to the environment;
   determining, based on the first sensor data and the third sensor data, a portion of further visual data corresponding to the single-track vehicle;
   providing the portion of the further visual data as an input to the machine-learned model trained to determine a predicted turning action of single-track vehicles; and
   receiving, from the machine-learned model, a further predicted turning action for the single-track vehicle based on the portion of the further visual data, wherein the autonomous vehicle is controlled based at least in part on the further predicted turning action.

4. The system of claim 1, wherein the single-track vehicle is identified at a first point in time, and wherein the portion of the visual data includes one or more image frames preceding the first point in time.

5. The system of claim 1, wherein the first sensor has a first modality and the second sensor has a second modality that is different from the first modality.

6. A method comprising:
   receiving, from a first sensor of an autonomous vehicle, first sensor data relating to an external environment of the autonomous vehicle;
   receiving, from a second sensor of the autonomous vehicle, second sensor data, the second sensor data comprising image data;
   identifying, based at least in part on the first sensor data, a person-wide vehicle in the external environment proximate to the autonomous vehicle;
   determining, based at least in part on the first sensor data, a portion of the second sensor data associated with the person-wide vehicle;
   determining, based at least in part on the portion of the second sensor data associated with the person-wide vehicle, that the image data includes the person-wide vehicle;
   inputting the image data to a machine-learned model;
   receiving, from the machine-learned model based on the image data, a future intention of the person-wide vehicle; and
   controlling the autonomous vehicle based at least in part on the future intention of the person-wide vehicle.

7. The method of claim 6, wherein the machine-learned model is trained based at least in part on log data, the log data including an action performed by one or more further person-wide vehicles and image data representing the one or more further person-wide vehicles.

8. The method of claim 7, wherein the action performed by the further person-wide vehicle is determined based at least in part on a velocity or a yaw of the person-wide vehicle between a first time and a second time that is later than the first time, and wherein at least a portion of the image data is associated with a third time that is earlier than the first time.

9. The method of claim 6, wherein the machine-learned model is trained to determine the future intention of the person-wide vehicle based at least in part on an attribute of the person-wide vehicle or a user of the person-wide vehicle in the image data, the attribute comprising:
   a head movement of the user of the person-wide vehicle;
   an extension of a hand or foot of the user of the person-wide vehicle;
   operation of one or more external controls of the person-wide vehicle by the user; or
   leaning of the user or person-wide vehicle.

10. The method of claim 6, wherein the future intention comprises an indication that the person-wide vehicle is predicted to turn left, turn right, travel straight ahead or be stationary.

11. The method of claim 6, comprising receiving, from the machine-learned model, a confidence level associated with the future intention of the person-wide vehicle.

12. The method of claim 6, comprising;
   determining, by a prediction component of the autonomous vehicle, a predicted trajectory of the person-wide vehicle based at least in part on the future intention; and
   controlling the autonomous vehicle based at least in part on the predicted trajectory.

13. The method of claim 12, comprising:
   determining, by the prediction component, a plurality of predicted trajectories of the person-wide vehicle and a plurality of corresponding confidence levels based at least in part on at least one of the first sensor data or the second sensor data;
   adjusting, by the prediction component, the corresponding confidence levels based at least in part on the future intention; and
   determining the predicted trajectory based at least in part on the corresponding confidence levels.

14. One or more non-transitory computer-readable media storing instructions executable by one or more processors, wherein the instructions, when executed, cause the one or more processors to perform operations comprising:
   receiving, from one or more sensors of an autonomous vehicle, first sensor data relating to an external environment of the autonomous vehicle;
   receiving, from the one or more sensors of the autonomous vehicle, second sensor data, at least one of the first sensor data or the second sensor data comprising image data;
   identifying, based at least in part on the first sensor data, a person-wide object in the external environment proximate to the autonomous vehicle;
   determining, based at least in part on the first sensor data, a portion of the second sensor data associated with the person-wide object;
   determining, based at least in part on the portion of the second sensor data, at least a portion of the image data associated with the person-wide object;
   inputting the image data to a machine-learned model;
   receiving, from the machine-learned model based on the image data, a future intention of the person-wide object; and
   controlling the autonomous vehicle based at least in part on the future intention of the person-wide object.

15. The computer-readable media of claim 14, wherein the computer-readable media stores the machine-learned model, and wherein the machine-learned model is trained based on log data, the log data indicating an action performed by one or more further person-wide objects and including image data representing the one or more further person-wide objects.

16. The computer-readable media of claim 15, wherein the action performed by the further person-wide object is determined based on a velocity or a yaw of the person-wide object between a first time and a second time that is later than the first time, and wherein at least a portion of the image data is associated with a third time that is earlier than the first time.

17. The computer-readable media of claim 14, wherein the machine-learned model is trained to determine the future intention of the person-wide object based at least in part on an attribute of the person-wide object or a user of the person-wide object in the image data, the attribute comprising:
   a head movement of the user of the person-wide object;
   an extension of a hand or foot of the user of the person-wide object;
   operation of one or more external controls of the person-wide object by the user; or
   leaning of the user or person-wide object.

18. The computer-readable media of claim 14, wherein the future intention comprises an indication that the person-wide object is predicted to turn left, turn right, travel straight ahead, or be stationary.

19. The computer-readable media of claim 14, wherein the operations comprise;
   determining, by a prediction component of the autonomous vehicle, a predicted trajectory of the person-wide object based at least in part on the future intention; and
   controlling the autonomous vehicle based at least in part on the predicted trajectory.

20. The computer-readable media of claim 19, wherein the operations comprise:
   determining, by the prediction component, a plurality of predicted trajectories of the person-wide object and a plurality of corresponding confidence levels based at least in part on at least one of the first sensor data or the second sensor data;
   adjusting, by the prediction component, the corresponding confidence levels based at least in part on the future intention; and
   determining the predicted trajectory based at least in part on the corresponding confidence levels.

* * * * *